(12) United States Patent
Ham

(10) Patent No.: US 7,362,399 B2
(45) Date of Patent: Apr. 22, 2008

(54) IN-PLANE SWITCHING MODE LIQUID CRYSTAL DISPLAY DEVICE

(75) Inventor: Yong Sung Ham, Kyungki-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/134,405

(22) Filed: Aug. 14, 1998

(65) Prior Publication Data

US 2001/0046018 A1 Nov. 29, 2001

(30) Foreign Application Priority Data

Aug. 14, 1997 (KR) ................. 1997-38863

(51) Int. Cl.
*G02F 1/1368* (2006.01)
*G02F 1/139* (2006.01)
*G02F 1/1337* (2006.01)

(52) U.S. Cl. ............ 349/141; 349/43; 349/123; 349/187

(58) Field of Classification Search ........... 349/122, 349/124, 138, 141, 110, 177, 181, 106, 187, 349/42, 43, 123, 128, 132; 345/88, 92
See application file for complete search history.

(56) References Cited

U.S. PATENT DOCUMENTS

| | | | | |
|---|---|---|---|---|
| 4,239,346 A | 12/1980 | Lloyd | ............ | 350/334 |
| 4,653,859 A * | 3/1987 | Masaki | ............ | 349/33 |
| 4,726,659 A | 2/1988 | Conrad et al. | ............ | 350/341 |
| 5,307,189 A | 4/1994 | Nishiki et al. | ............ | 359/59 |
| 5,321,535 A | 6/1994 | Ukai et al. | ............ | 359/55 |
| 5,459,596 A | 10/1995 | Ueda et al. | ............ | 359/59 |
| 5,464,669 A * | 11/1995 | Kang et al. | ............ | 349/124 |
| 5,492,762 A | 2/1996 | Hirai et al. | ............ | 428/447 |
| 5,576,858 A | 11/1996 | Ukai et al. | ............ | 359/59 |
| 5,598,285 A | 1/1997 | Kondo et al. | ............ | 349/39 |
| 5,600,464 A | 2/1997 | Ohe et al. | ............ | 349/123 |
| 5,602,662 A * | 2/1997 | Rosenblatt et al. | ...... | 349/130 |
| 5,608,556 A | 3/1997 | Koma | ............ | 349/143 |

(Continued)

FOREIGN PATENT DOCUMENTS

EP 0 368 260 5/1990

(Continued)

OTHER PUBLICATIONS

Partial computer translation of JP 06-160878, Jun. 1994.*

(Continued)

*Primary Examiner*—Toan Ton
*Assistant Examiner*—Tai Duong
(74) *Attorney, Agent, or Firm*—McKenna Long & Aldridge, LLP

(57) ABSTRACT

An in-plane switching mode liquid crystal display device includes first and second substrates, a plurality of gate and data bus lines defining pixel regions and arranged on the first substrate, a common line in the pixel regions, a pair of first and second electrodes parallel to each other applying plane electric fields in the pixel regions, and a liquid crystal layer between the first and second substrates, $d\Delta n$ being in the range of 0.29-0.36 um, where d is the thickness of the liquid crystal layer, and $\Delta n$ is the refractive anisotropy of the liquid crystal molecule.

8 Claims, 3 Drawing Sheets

U.S. PATENT DOCUMENTS

| | | | |
|---|---|---|---|
| 5,646,705 A | 7/1997 | Higuchi et al. | 349/143 |
| 5,686,019 A | 11/1997 | Nakamura | 252/299.01 |
| 5,737,051 A * | 4/1998 | Kondo et al. | 349/141 |
| 5,742,369 A | 4/1998 | Mihara et al. | 349/123 |
| 5,745,207 A | 4/1998 | Asada et al. | 349/141 |
| 5,757,455 A | 5/1998 | Sugiyama et al. | 349/129 |
| 5,760,856 A | 6/1998 | Yanagawa et al. | 349/42 |
| 5,760,857 A | 6/1998 | Yanagawa et al. | 349/43 |
| 5,781,261 A | 7/1998 | Ohta et al. | 349/111 |
| 5,786,876 A | 7/1998 | Ota et al. | 349/42 |
| 5,793,459 A | 8/1998 | Toko | 349/128 |
| 5,831,701 A | 11/1998 | Matsuyama et al. | 349/110 |
| 5,841,499 A | 11/1998 | Baur et al. | 349/141 |
| 5,852,485 A | 12/1998 | Shimada et al. | 349/141 |
| 5,859,682 A | 1/1999 | Kim et al. | 349/124 |
| 5,870,160 A * | 2/1999 | Yanagawa et al. | 349/141 |
| 5,886,762 A | 3/1999 | Lee et al. | 349/141 |
| 5,907,380 A | 5/1999 | Lien | 349/141 |
| 5,910,271 A * | 6/1999 | Ohe et al. | 349/122 |
| 5,914,762 A | 6/1999 | Lee et al. | 349/141 |
| 5,946,060 A | 8/1999 | Nishiki et al. | 349/48 |
| 5,946,067 A | 8/1999 | Kim et al. | 349/141 |
| 5,956,111 A | 9/1999 | Ohta et al. | 349/141 |
| 5,959,708 A | 9/1999 | Lee et al. | 349/143 |
| 5,969,782 A | 10/1999 | Lee et al. | 349/141 |
| 5,977,562 A | 11/1999 | Hirakata et al. | 257/72 |
| 5,995,186 A | 11/1999 | Hiroshi | 349/141 |
| 6,005,650 A | 12/1999 | Kim et al. | 349/130 |
| 6,040,887 A | 3/2000 | Matsuyama et al. | 349/141 |
| 6,266,116 B1 * | 7/2001 | Ohta et al. | 349/141 |

FOREIGN PATENT DOCUMENTS

| | | |
|---|---|---|
| EP | 0 588 568 | 9/1993 |
| EP | 0 749 029 | 12/1996 |
| JP | 6160878 | 6/1974 |
| JP | 60-158421 | 8/1985 |
| JP | 62-078532 | 4/1987 |
| JP | 04-067127 | 3/1992 |
| JP | 06-273803 | 9/1994 |
| JP | 07-036058 | 2/1995 |
| JP | 07-134301 | 5/1995 |
| JP | 07-225388 | 8/1995 |
| JP | 08-062586 | 3/1996 |
| JP | 09-005763 | 1/1997 |
| JP | 09-005764 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-269507 | 10/1997 |
| JP | 09-325346 | 12/1997 |
| KR | 96-32049 | 9/1996 |
| KR | 97-22458 | 5/1997 |
| KR | 98-040330 | 8/1998 |
| KR | 98-083765 | 12/1998 |
| WO | 97-10530 | 3/1997 |

OTHER PUBLICATIONS

S. Matsumoto, Display Characteristics of In-Plane Switching (IPS) LCDs and a Wide-Viewing-Angle 14.5-in. IPS TFT-LCD; Euro Display '96, pp. 445-448

H. Wakemoto, "An Advanced In-Plane-Switching Mode", TFT-LCD, 1997 SID Digest, pp. 929-932.

M-Oh-e, "Principles and Characteristics of Electro-Optical Behaviour with In-Plane Switching Mode", Asia Display '95, pp. 577-580.

M. Ohta, "Development of Super-TFT-LCDs With In-Plane Switching Display Mode", 1995, Asia Display '95, pp. 707-710.

S. H. Lee, "High-Transmittance, Wide-Viewing-Angle Nematic Liquid Crystal Display Controlled by Fringe-Field Switching", Asia Display '98, pp. 371-374.

R. Kiefer, "In-Plane Switching of Nematic Liquid Crystals", Japan Display '92, pp. 547-550.

* cited by examiner

IN-PLANE SWITCHING MODE LIQUID CRYSTAL DISPLAY DEVICE

This application claims the benefit of Korean Patent Application No. 1997-38863, filed on Aug. 14, 1997, which is hereby incorporated by reference.

BACKGROUND OF THE INVENTION

1. Field of the Invention

The present invention relates to a liquid crystal display device, and more particularly, an in-plane switching mode liquid crystal display device.

2. Discussion of the Related Art

Twisted nematic liquid crystal display devices (hereinafter TN LCDs) having high image quality and low power consumption are widely applied to flat panel display devices. TN LCDs, however, have a narrow viewing angle due to refractive anisotropy of liquid crystal molecules. This is because horizontally aligned liquid crystal molecules prior to applying a voltage become nearly vertically aligned with respect to the substrate when voltage is applied to the liquid crystal panel.

To solve this problem, a multi-domain LCD such as a two-domain TN LCD (TDTN LCD) and a domain divided TN LCD (DDTN LCD), and a TN LCD including an optical compensation film have been introduced. In these LCDs, however, a contrast ratio is decreased and a color shift is generated according to a viewing angle.

Further, for the purpose of obtaining a wide viewing angle, an in-plane switching mode LCD has also been proposed.

FIG. 1A is a plan view of a unit pixel of a conventional in-plane switching mode active matrix LCD. As shown in the drawing, the apparatus comprises a data bus line 1 and a gate bus line 2 which are arranged perpendicularly and/or horizontally in a matrix on a transparent substrate thereby defining a unit pixel region. A common line 5 is arranged parallel to the gate bus line 2 in the pixel region. A thin film transistor (TFT) is formed adjacent a cross point of the data bus line 1 and the gate bus line 2. A common electrode 11 and a data electrode 19 are formed in the pixel region.

FIG. 1B is a sectional view according to line I-I of FIG. 1A. As shown in the drawing, the TFT includes a gate electrode 10 electrically coupled with the gate bus line 2, a gate insulator 10 on a gate electrode 10, an a-Si layer 15 on a gate insulator 13, an n+a-Si layer 16 on the a-Si layer 15, and source/drain electrodes 17, 18 which are electrically coupled the data bus line 1 and the data electrode 19, respectively. The gate insulator 13 is formed on the inner surface of a first substrate 4. The common electrode 11 is formed with the gate electrode 10 and electrically coupled to the common line 5. Further, a passivation layer 20 and a first alignment layer (21) are deposited on the inner surface of the first substrate 4.

On a second substrate 6, a black matrix 7 is formed to prevent a light leakage around the TFT, the data bus line 1, an the gate bus line 2. A color filter later 8, an over-coat layer 9, and a second alignment layer (22) are formed on the black matrix 7 in sequence. Finally, a liquid crystal layer is formed between the first and second alignment layers.

The above conventional in-plane switching mode LCD, however, has a complex pattern in the pixel region thereby decreasing aperture ratio. The following formula (1) represents a light transmittance ($T/T_o$) in the liquid crystal layer of the conventional in-plane switching mode LCD.

$$T/T_o = \sin^2(2\alpha)\sin^2(\pi d\Delta n/\lambda) \quad (1)$$

, where $\alpha$ is an average rotating angle of liquid crystal directors, $d\Delta n$ is a retardation by the liquid crystal layer, d is a thickness of the liquid crystal layer, $\Delta n$ is the refractive anisotropy of the liquid crystal layer, and $\lambda$ is a wavelength of light.

As shown in the above formula, if each of liquid crystal molecules having fixed conditions $\alpha$, and $\Delta n$ is used, a desirable light transmittance can be achieved in accordance with the thickness d of the liquid crystal layer.

The Japanese Patent Unexamined Publication No. 6-160878 proposed a TFT-LCD having a high light transmittance by providing a high aperture ratio and preventing a degradation failure in the pixel region. Further, the LCD may have been manufactured rapidly by choosing freely a liquid crystal compound and an alignment material. Furthermore, in this LCD, the increased light transmittance may have been achieved by the rotation of the liquid crystal molecules and by permitting $d\Delta n$ to be in a range of 0.21-0.36 um.

In general, since a color-display in the LCD is based on the transmittance variation of the wavelength according to $d\Delta n$, it is essential to determine a desire $d\Delta n$ so as to display all colors.

However, JP No. 6-160878 only discloses $d\Delta n$ considering the light transmittance in the liquid crystal layer. The conventional TFT-LCD including JP No. 6-160878 does not disclose a desirable $d\Delta n$ that considers the effect of color-shift.

SUMMARY OF THE INVENTION

Accordingly, the present invention is directed to an in-plane switching mode LCD that substantially obviates one or more of the problems due to limitations and disadvantages of the related art.

An object of the present invention is to provide an in-plane switching mode LCD having a high light transmittance by controlling the refractive anisotropy of the liquid crystal molecule and the thickness of the liquid crystal layer.

Another object of the present invention is to provide an LCD that prevents color-shift.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device comprises first and second substrates; a plurality of gate and data bus lines defining pixel regions and arranged on the first substrate; a common line in the pixel regions; a pair of first and second electrodes parallel to each other applying plane electric fields in the pixel regions; and a liquid crystal layer between the first and second substrates; wherein $d\Delta n$ is in the range of 0.29-0.36 um, where d is the thickness of the liquid crystal layer, and $\Delta n$ is the refractive anisotropy of the liquid crystal molecule.

In another aspect of the present invention, a method of making an in-plane switching mode liquid crystal display device having first and second substrates comprises the steps of forming a plurality of gate and data bus lines defining pixel regions and arranged on the first substrate; forming a common line in the pixel regions; forming a pair of first and second electrodes parallel to each other applying plane electric fields in the pixel regions; and forming a liquid crystal layer between the first and second substrates; wherein dΔn is in the range of 0.29-0.36 um, where d is the thickness of the liquid crystal layer, and Δn is the refractive anisotropy of the liquid crystal molecule.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1A:
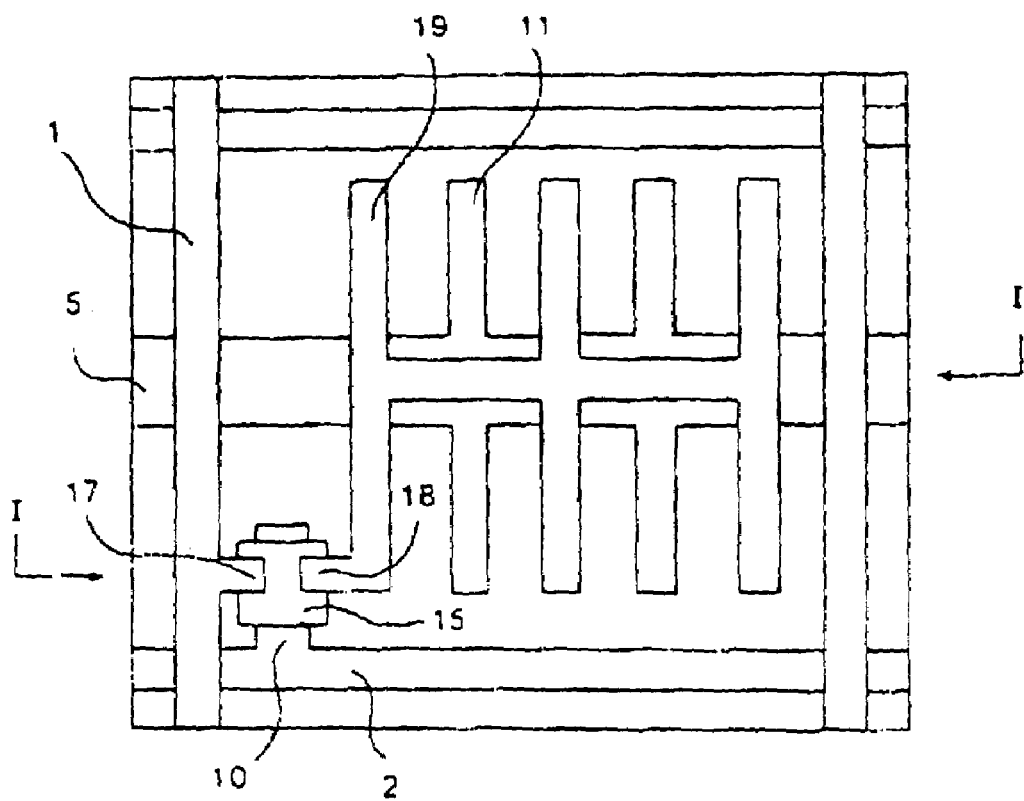
FIG. 1A is a plan view of a unit pixel of a conventional in-plane switching mode LCD.
Figure 1B:
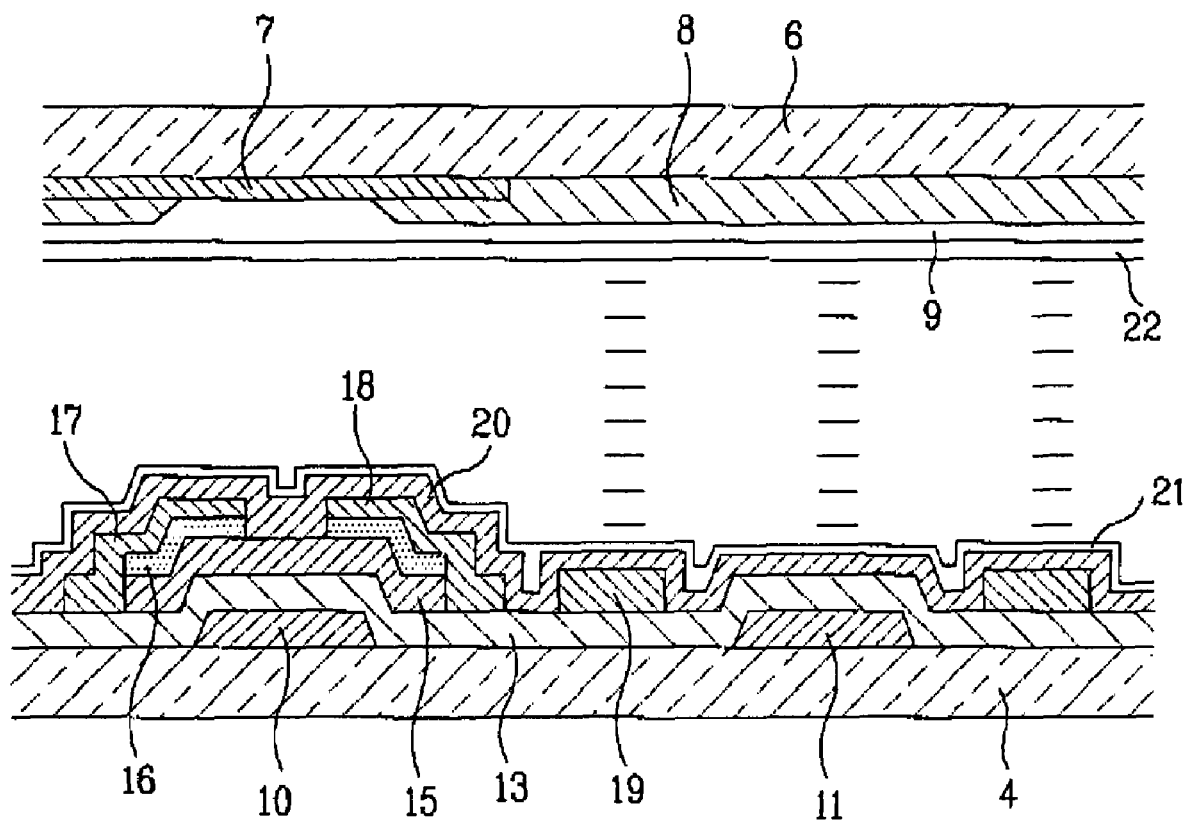
FIG. 1B is a sectional view according to line I-I of FIG. 1A.

Reference will now be made in detail to the preferred embodiment of the present invention, an example of which is illustrated in the accompanying drawings.

Although not shown in the drawing, an LCD according to the present invention comprises a first substrate, a second substrate and a liquid crystal layer between the first and second substrates. On the first substrate, a data bus line and a gate bus line arranged perpendicularly and/or horizontally in a matrix on a transparent substrate thereby defining a unit pixel region. A common line is arranged parallel to the gate bus line in the pixel region. A thin film transistor is formed adjacent a cross point of the data bus line and the gate bus line. A common CelCN (cellulosecinnamate).

Color-shift which is generated in an in-plane switching mode LCD is influenced by a back light, a color filter, and dΔn of the liquid crystal layer. In particular, conventional back light and color may be used, but dΔn is chosen to prevent color-shift. Moreover, the dΔn is chosen to maintain white color balance.

Figure 2:
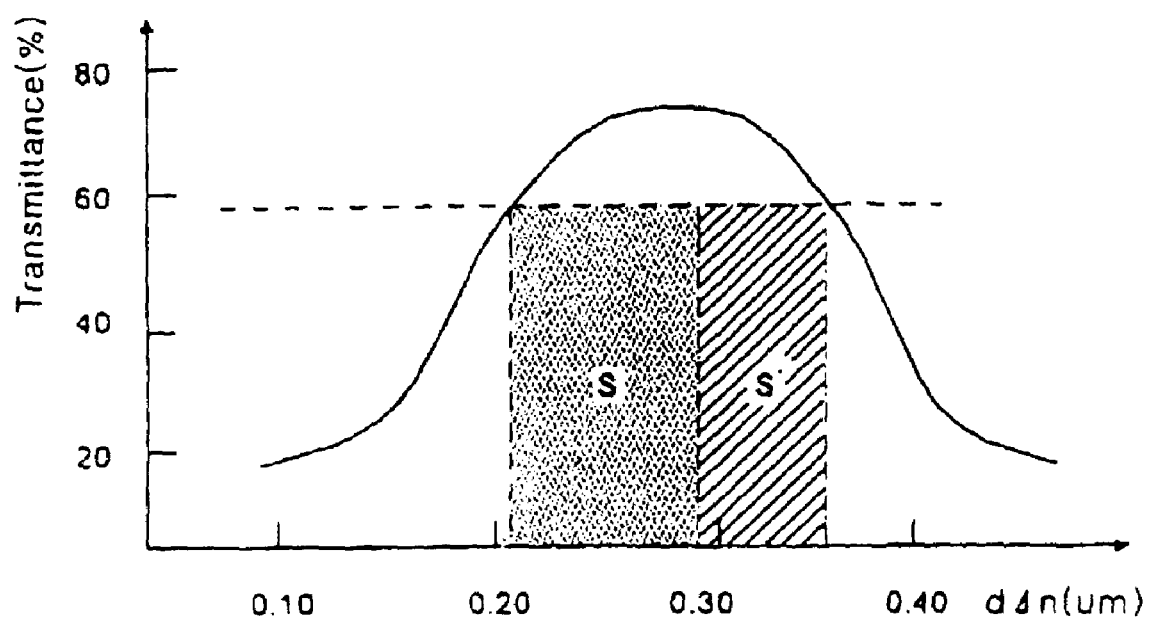
FIG. 2 is a graph showing a variation of light transmittance according to a variation of retardation.

FIG. 2 is a graph showing a variation of light transmittance according to a variation of retardation. As shown in the graph, S+S' region is a limited region according to the prior art indicating that dΔn is in the range of 0.21-0.36 um, and S' region is a further limited region according to the present invention.

Figure 3:
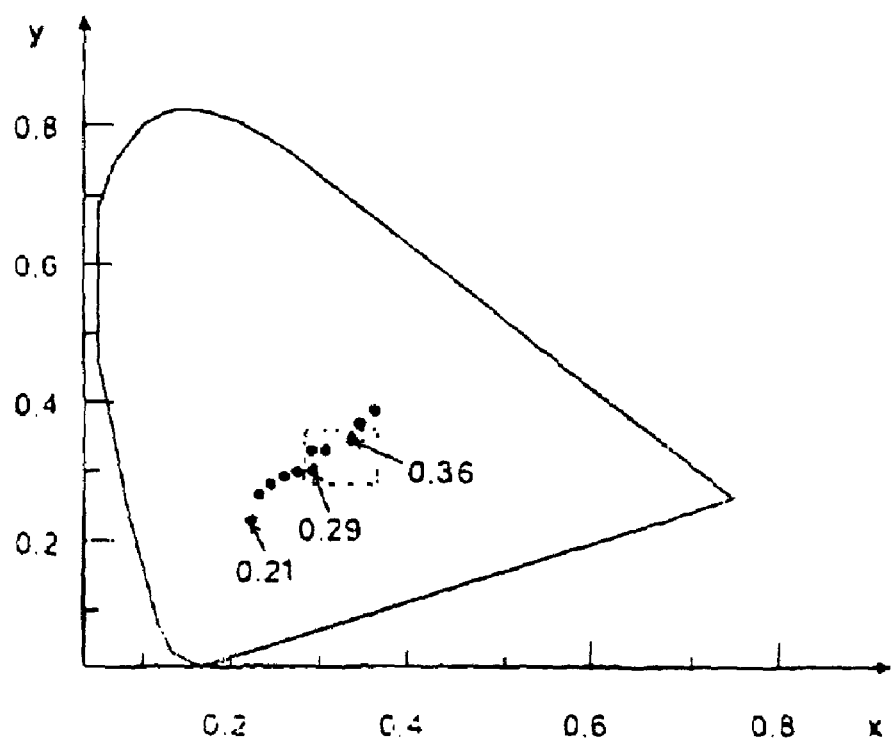
FIG. 3 is a chromaticity diagram showing a white color-shift in color triangle.

FIG. 3 is a chromaticity diagram showing a white color-shift in color triangle. A plurality of points in FIG. 3 representing dΔn is in the range of 0.21-0.40 um. A subset of these points are in a dotted line rectangle (white color display region) 30 and is in the range of 0.29-0.36 um as shown in FIG. 2 of the present invention.

If dΔn is in the range of 0.21-0.29 um, it is impossible to display the preferable white color. However, in the present invention, dΔn is in the range of 0.29-0.36 um and all points are in the inner region of the dotted line rectangle.

In accordance with the present invention, it is possible to increase the light transmittance by controlling the refractive anisotropy of the liquid crystal molecule and the thickness of the liquid crystal layer.

Further, it is possible to prevent color-shift in the LCD of electrode and a data electrode are in the pixel region.

The TFT includes a gate electrode electrically coupled with the gate bus line, a gate insulator made of a material such as SiNx and SiOx on the gate electrode, an amorphous silicon layer on the gate insulator, a n+ amorphous silicon layer on the a-Si layer, and source/drain electrodes which are electrically coupled the data bus line and the data electrode respectively.

The common electrode is formed with the gate electrode and electrically coupled to the common line. Also, a passivation layer made of a material such as SiNx and SiOx, and a first alignment layer are deposited on the inner surface of the first substrate.

On the second substrate, a black matrix such as CrOx and black resin is formed to prevent a light leakage around the TFT, the data bus line, and the gate bus line. A color filter layer including color filter elements R, G, and B, an overcoat layer, and a second alignment layer are formed on the black matrix in sequence.

The liquid crystal layer is formed between the first and second alignment layers. The thickness of the liquid crystal is chosen considering the light transmittance and the color-shift.

Each alignment direction of the first and second alignment layers is determined by a rubbing method using polyamide, polyimide, $SiO_2$, PVA (polyvinylalcohol) or polyamic acid, or by photo-alignment method using a photosensitive material such as PVCN (polyvinylcinnamate), PSCN (polysiloxanecinnamate) or the present invention, especially white color-shift.

Accordingly, the in-plane switching mode liquid crystal display device of the present invention comprises elements of an LCD such as transparent substrates, electrodes, and alignment layer and so on. In the LCD device of the present invention, thickness of the liquid crystal layer is determined by considering the color-shift as well as the light transmittance. Preferably, dΔn of the present invention is in a range of 0.29-0.36 um, thereby preventing the LCD from color-shift, especially white color-shift.

It will be apparent to those skilled in the art that various modifications and variation can be made in the in-plane switching mode liquid crystal display of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:
   first and second substrates;
   a plurality of gate and data bus lines defining pixel regions and arranged on the first substrate;
   a common line in the pixel region, the common line and the data bus lines having a crossing relationship;
   a pair of first and second electrodes parallel to each other applying plane electric fields in the pixel regions; and
   a liquid crystal layer between the first and second substrates;
   wherein dΔn is in the range of 0.29-0.36 μm and transmittance is greater than or equal to 60 percent, where d is the thickness of the liquid crystal layer, and $\Delta n$ is the refractive anisotropy of the liquid crystal molecule;

a plurality of thin film transistors adjacent respective cross points of the gate and data bus lines, each of the thin film transistors including a gate electrode, a gate insulator, a semiconductor layer, and source and drain electrodes;

a passivation layer on the thin film transistors;

a first alignment layer on the passivation layer;

a black matrix for preventing light from leaking around the TFTs gate bus line and data bus line;

a color filter layer on the second substrate; and a second alignment layer on the color filter layer, wherein the first and second alignment layers comprises polysiloxanecinnamate; and wherein d$\Delta$n is selected to achieve a desired light transmittance and color-shift.

2. The in-plane switching mode liquid crystal display device according to claim 1, wherein the first electrode includes data electrode and the second electrode includes common electrode.

3. The in-plane switching mode liquid crystal display device according to claim 1, wherein the passivation layer includes one of SiNx and SiOx.

4. The in-plane switching mode liquid crystal display device according to claim 1, wherein the common line is substantially perpendicular to the data bus lines.

5. A method of making an in-plane switching mode liquid crystal display device having first and second substrates, the method comprising the steps of:

forming a plurality of gate and data bus lines defining pixel regions and arranged on the first substrate;

forming a common line in the pixel region, the common line and the data bus lines having a crossing relationship;

forming a pair of first and second electrodes parallel to each other applying plane electric fields in the pixel regions; and forming a liquid crystal layer between the first and second substrates;

wherein d$\Delta$n is in the range of 0.29-0.36 µm and transmittance is greater than or equal to 60 percent, where d is the thickness of the liquid crystal layer, and $\Delta n$ is the refractive anisotropy of the liquid crystal molecule;

forming a plurality of thin film transistors adjacent respective cross points of the gate and data bus lines, each of the thin film transistors including a gate electrode, a gate insulator, a semiconductor layer, and source and drain electrodes;

forming a passivation layer on the thin film transistors;

forming a first alignment layer on the passivation layer;

forming a black matrix for preventing light from leaking around the thin film transistors, gate bus line, and data bus lines, forming a color filter layer on the second substrate; and forming a second alignment layer on the color filter layer, wherein the first and second alignment layers comprises polysiloxanecinnamate; and wherein d$\Delta$n is selected to achieve a desired light transmittance and color-shift.

6. The method according to claim 5, wherein the first electrode includes data electrode and the second electrode includes common electrode.

7. The method according to claim 5, wherein the passivation layer includes one of SiNx and SiOx.

8. The method according to claim 5, wherein the common line is substantially perpendicular to the data bus lines.

* * * * *